P. F. COX.
BEER TAPPING DEVICE.
APPLICATION FILED DEC. 4, 1907.
908,447.
Patented Jan. 5, 1909.
2 SHEETS—SHEET 1.
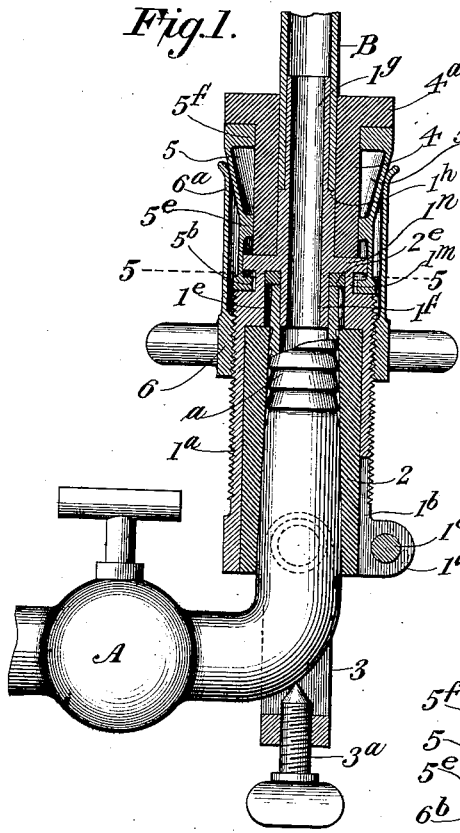
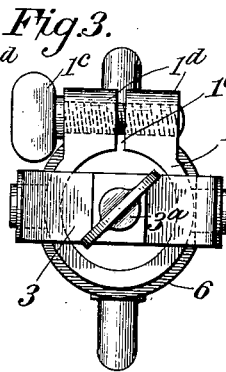
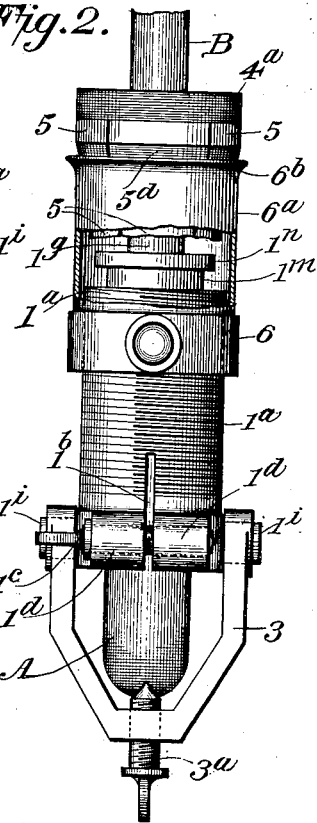
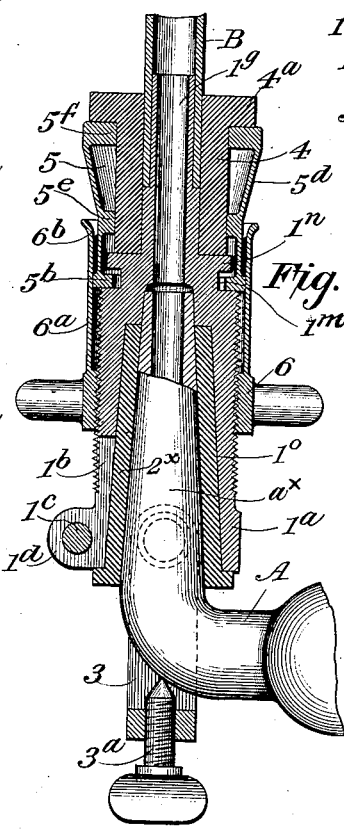
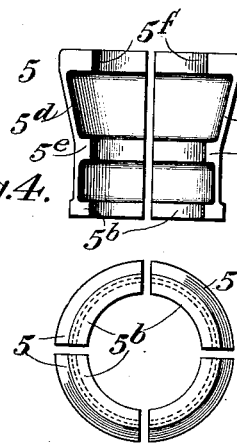
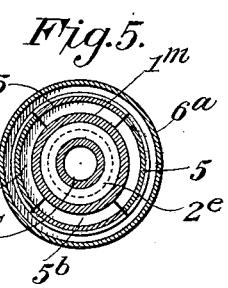
Inventor:
Paul F. Cox
Witnesses
H. E. Fowler
James P. Mansfield
By Alexander Sowell
Attorney

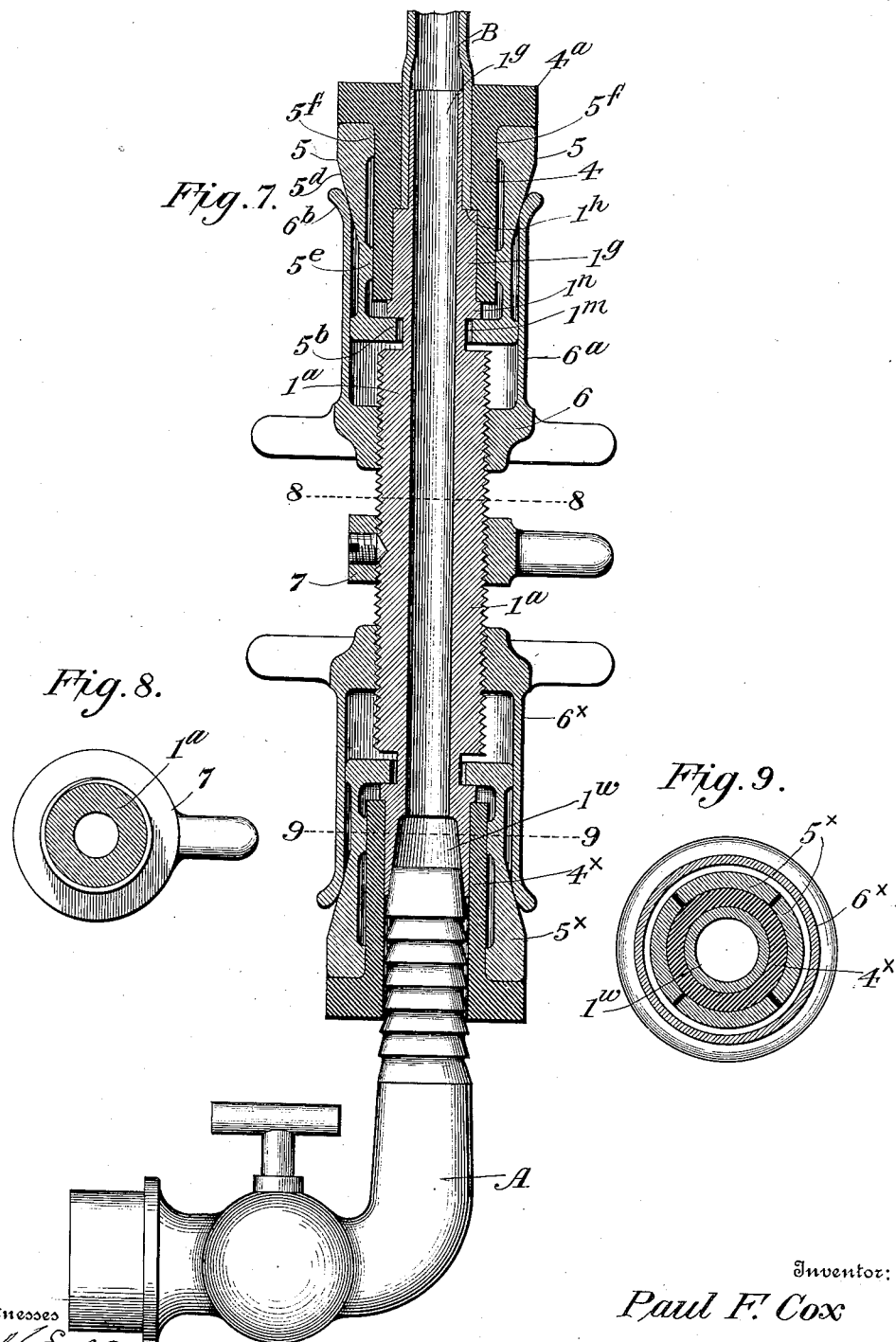

UNITED STATES PATENT OFFICE.

PAUL FLEMMING COX, OF JACKSON, MICHIGAN.

BEER-TAPPING DEVICE.

No. 908,447.

Specification of Letters Patent.

Patented Jan. 5, 1909.

Application filed December 4, 1907. Serial No. 404,982.

*To all whom it may concern:*

Be it known that I, PAUL FLEMMING COX, of Jackson, in the county of Jackson and State of Michigan, have invented certain new and useful Improvements in Beer-Tapping Devices; and I hereby declare that the following is a full, clear, and exact description thereof, reference being had to the accompanying drawings, which form part of this specification.

This invention is an improvement in devices for connecting dispensing apparatus with a vessel containing effervescent liquors; and is especially adapted for use as a beer-tapping device, or means for connecting beer-kegs with a dispensing cock.

The object of the invention is to provide a simple and effective means for forming an all-metallic gas-tight joint between the pipe leading to the dispensing apparatus, and the faucet attached to the vessel containing the liquid to be dispensed, and to enable the pipe to be readily attached or detached from the device, or the device to be readily attached to or detached from the faucet; and the device can be attached to or detached from the pipe without affecting or disturbing its connection to the faucet, or vice versa; and the connection or disconnection can be made almost instantly, in such a simple manner that no particular skill is required to use or apply the device.

A further object of the invention is to so construct the device that all the joints will be metallic and the liquid will not be contaminated by rubber piping or packing.

The invention will be clearly understood from the following description, and accompanying drawings, which illustrate the preferred form, and some obvious modified forms, of the device; and the claims set forth the features and combinations of parts for which protection is desired.

In said drawings—Figure 1 is a sectional view of the preferred form of the device connecting the dispensing pipe to a faucet. Fig. 2 is a side view of Fig. 1, showing the yoke and clamping screw. Fig. 3 is an end view of the device detached from faucet. Fig. 4 is an end and side view of the clamping segments. Fig. 5 is a section on line 5—5, Fig. 1. Fig. 6 is a sectional view of one modification of the device. Fig. 7 is a similar view of another modification. Fig. 8 is a section on line 8—8, Fig. 7; and Fig. 9 is a section on line 9—9, Fig. 7.

A, designates the usual faucet or cock attached to a vessel containing carbonated or fermented liquors, such as beer.

B, is the dispensing pipe, or pipe connected to dispensing apparatus (not shown), which is customarily made of block tin, or other non-corrodible metal. The faucet A ordinarily has a tapered and fluted discharge end $a$, for attachment to the device which forms the connection between the faucet and pipe B.

The preferred form of connecting device constructed in accordance with my invention, comprises a tubular body preferably of brass and having a tubular portion $1^a$ adapted to fit over the end $a$ of the faucet. A tubular packing 2, preferably of rubber, is placed within part $1^a$ around the end $a$, to make a gas-tight joint therebetween. Preferably part $1^a$ is split, as at $1^b$, and a bolt $1^c$ is tapped through lugs $1^d$ on opposite sides of the split, (see Fig. 2,) by which the split end can be contracted to make a gas-tight joint between the part $1^a$ and end $a$ of the faucet, by compressing packing 2 therebetween.

The body has a tubular portion $1^g$ of small diameter extending axially from the part $1^a$, and within part $1^a$, and around the inner end of part $1^g$, is a collar $1^f$, surrounded by an annular recess $1^e$, into which recess the extremity of end $a$ of the faucet extends and telescopes over the collar as shown in Fig. 1; and in recess $1^e$ is placed a packing $2^e$, preferably of lead or other soft non-corrodible metal, adapted to make a close metallic joint between the end $a$ of faucet A and the body 1. In order to insure a close joint at this point, the body may be clamped onto the faucet in any desired way. As shown it is provided with a yoke 3 hung on lugs $1^i$ on the end of part $1^a$, and adapted to be swung under the neck of the faucet as shown in Fig. 1, and a screw $3^a$ is tapped through the shank of the yoke and can be screwed against the faucet as shown in Figs. 1 and 2, so as to draw the body 1 tightly upon the part $a$.

The outer end of part $1^g$ is reduced in external diameter so that it can readily enter the end of the dispensing pipe B, which is telescoped thereon as shown, said pipe resting against a shoulder $1^h$. Surrounding the telescoped portions or joint between part $1^g$ and end of pipe B, is a sleeve bushing or packing 4, preferably of rubber, and having a projecting flange $4^a$ on its outer end.

Surrounding sleeve 4 is an annular clamp, preferably composed of four or more sections or segments 5, (see Figs. 1 and 4), which are provided on their inner ends with inwardly projecting flanges $5^b$, adapted to engage a groove $1^m$, in an annular part $1^n$ of the body, at the junction of parts $1^a$, $1^g$, by which means the clamp-segments are held in position around the sleeve bushing 4.

The clamp-segments are prevented from disengaging the groove $1^m$ by means of a sleeve-nut 6 screwed onto part $1^a$ (which is exteriorly threaded as shown), and having a cylindrical portion $6^a$ extending over the flanged ends of clamp-segments 5 and holding said segments in engagement with the groove $1^m$. The segments 5 are provided with outwardly inclined portions $5^d$ with which the outer end, $6^b$, of the sleeve-nut 6 will engage and by screwing the sleeve-nut outwardly, the clamp is contracted upon the bushing 4, and will bind the same tightly upon and against the part $1^g$ and pipe B, making a perfectly gas-tight joint therebetween. The clamp segments 5 are preferably provided on their inner faces with internal projections $5^e$ and $5^f$ which are respectively adapted to press the bushing 4 against the part $1^g$ and the pipe B, as shown.

By running the sleeve-nut 6 back against the lugs $1^i$, the clamping segments may be removed, but in operating the device it is only necessary to back the nut sufficiently to permit the clamping segments to release their pressure on the bushing 4; then the device may be readily disconnected from (or connected to) the pipe B.

In operation the faucet A is first screwed into the vessel or keg. The part $1^a$ of the body, with the packing 2, is then slipped onto end $a$ of the faucet, and is clamped thereto so as to form a close joint at $2^e$, as described. Sleeve-nut 6 is then backed to allow the expansion of the clamp, and then the end of pipe B is slipped over part $1^g$; then the sleeve-nut is screwed up so as to compress the bushing 4 against the pipe B and part $1^g$; and the apparatus is ready for use. The manner of disconnecting is obvious. When so applied, it will be seen that a continuous metallic conduit is formed from the faucet A to the pipe B, and the liquid does not any where contact with the rubber packings. In changing the faucet from one keg to another, it is not necessary to detach the device from it, but only to detach the device from pipe B, until the faucet is screwed home; and in such cases the faucet practically becomes part of the device. If the kegs are provided with individual faucets, the device can be detached from one faucet and attached to the next without disconnecting it from pipe B.

As shown in Fig. 6 the body has the same construction as in Fig. 1 for engaging pipe B; but has its part $1^a$ provided with a tapered bore $1^o$ to engage the tapered part $a^x$ of the faucet, a washer $2^x$ being interposed between part $1^a$ and part $a$. The part $1^a$ being secured to the faucet by the clamping screw $1^c$. Similar parts in Figs. 1 and 6 are similarly lettered and are readily understood.

As shown in Fig. 7 the body is elongated, its upper part is constructed to engage pipe B as in Fig. 1, and provided with a bushing 4, clamp segments 5, and sleeve-nut 6 as already described. The lower end of part $1^a$, in Fig. 7, is provided with a cylindric internally tapered portion $1^w$, engaging the end of part $a$ of the faucet, and around this part $1^w$, is a bushing $4^x$, clamp-segments $5^x$, and a sleeve-nut $6^x$, (similar to the bushing 4, clamp-segments 5, and sleeve-nut 6 already described,) by which a water and gas-tight connection is formed between the device and the faucet, similarly to its connection to pipe B. In this instance a collar 7 may be fastened upon the body intermediate the sleeve-nuts 6, $6^x$, to prevent their being backed too far off their respective segments.

The modified forms of the connecting device are obviously similar to the preferred form, and the mode of applying and using them will be clearly understood from the foregoing explanation and the drawings.

Having described my invention what I desire to secure by Letters Patent is:

1. In combination a faucet, a dispensing pipe a body having one end connected with the faucet, and its other end detachably fitted to the end of the dispensing pipe, a sleeve bushing surrounding the junction of the body and pipe, an annular series of clamping segments connected with the body and surrounding the said bushing and a sleeve nut screwed on the body and having a cylindric portion engaging the clamping segments.

2. In a device for connecting a dispensing pipe to a faucet, the combination of a body adapted to be connected with the faucet and having a portion adapted to telescope with the end of the dispensing pipe, a compressible sleeve bushing surrounding the joint between the dispensing pipe and body, and a sectional clamp surrounding the bushing, and a sleeve-nut screwed on the body and engaging the clamp, substantially as described.

3. A device for connecting dispensing pipes to faucets comprising a body having one end connected with the faucet, and its other end provided with a reduced portion fitted to the dispensing pipe, an annular series of clamp segments loosely connected to the body, a sleeve-nut on the body engaging said segments and retaining them on the body, a bushing interposed between the clamp segments and the end of the body connected to the dispensing pipe.

4. A device for the purpose described, comprising a body having a tubular end adapted to engage a faucet and its other end reduced in diameter and adapted to engage the end of a dispensing pipe, an annular sectional clamp surrounding the reduced end of the body, a sleeve-nut screwed on the body and having a cylindric portion engaging said clamp, and a bushing interposed between the clamp and the reduced portion of the body.

5. A device for the purpose described, comprising a grooved body having a tubular end adapted to engage a faucet and its other end reduced in diameter, and adapted to engage the end of a dispensing pipe, a series of clamp segments engaging a groove in the body, a sleeve-nut screwed on the body and having a cylindric portion engaging the clamping segments, and a bushing interposed between the clamping segments and the dispensing pipe.

6. In combination, a body having a tubular end adapted to engage a faucet and provided with a metallic bushing to contact the discharge end of the faucet, a yoke pivoted to the body and a screw tapped through the yoke engaging the faucet, a bushing on the other end of the body adapted to surround the end of a dispensing pipe, a series of clamping segments hung on the body surrounding the latter bushing and a sleeve-nut threaded on the body and engaging the segments.

7. In combination, a body having a tubular end adapted to receive a faucet and provided with an annular bushing interposed between the body and the inclosed portion of the faucet, a yoke pivoted to the body and a screw tapped through the yoke engaging the faucet, a sleeve bushing surrounding the other end of the body, a series of clamping segments hung on the body and surrounding the bushing, and a sleeve nut threaded on the body and engaging the segments.

8. In combination with a faucet and a dispensing pipe, a connecting device comprising a body having a socketed end fitted over the discharge end of the faucet, a bushing interposed between the discharge end of the faucet and the body, and means for clamping the bushing between the body and faucet, said body having a reduced portion adapted to engage the dispensing pipe, a bushing surrounding the reduced portion of the body, an annular clamp surrounding said bushing, and a sleeve-nut engaging the clamping segments.

9. A device of the character described comprising a body having an annular groove and a reduced portion, a series of clamping segments surrounding the reduced portion and having flanges on their inner ends engaging the annular groove in the body, and a sleeve-nut threaded on the body and having a tubular portion extending over the flanged ends of the clamps retaining them in position and adapted to cause the clamps to contract.

10. In a connecting device of the character described, the combination of a body having an annular groove, a series of clamping segments having flanges on their inner ends engaging the annular groove in the body, and outwardly projecting portions, and a sleeve-nut threaded on the body and having a tubular portion extending over the flanged ends of the clamps retaining them in position and adapted to engage the projecting portions of the clamps and cause them to contract.

11. In combination with a faucet and a dispensing pipe, a connecting device comprising a body having an annular groove and a socketed end fitted over the discharge end of the faucet, a bushing interposed between the discharge end of the faucet and the body, and means for clamping the bushing between the body and faucet, said body also having a reduced portion adapted to enter the end of the dispensing pipe, a sleeve bushing surrounding the reduced portion of the body and the telescoped end of the dispensing pipe, an annular series of clamping segments surrounding said sleeve bushing having flanged inner ends engaging the annular groove in the body, and a sleeve-nut threaded upon the body and engaging the clamping segments.

In testimony that I claim the foregoing as my own, I affix my signature in presence of two witnesses.

PAUL FLEMMING COX.

Witnesses:
JOHN W. KNIGHT, Jr.,
JAY BINNING.